(12) United States Patent
Lueck et al.

(10) Patent No.: US 11,731,761 B2
(45) Date of Patent: Aug. 22, 2023

(54) SECONDARY AIRFOIL APPARATUS, SYSTEM, AND METHOD FOR IMPROVING LIFT AND AERODYNAMIC PERFORMANCE OF A FLOATPLANE

(71) Applicant: Comp Air Solutions, LLC, Titusville, FL (US)

(72) Inventors: Ronald A. Lueck, Merritt Island, FL (US); Michael Ryan, Jefferson City, MO (US)

(73) Assignee: Comp Air Solutions, LLC, Titusville, FL (US)

( * ) Notice: Subject to any disclaimer, the term of this patent is extended or adjusted under 35 U.S.C. 154(b) by 0 days.

(21) Appl. No.: 17/674,542

(22) Filed: Feb. 17, 2022

(65) Prior Publication Data

US 2022/0258860 A1    Aug. 18, 2022

Related U.S. Application Data (60) Provisional application No. 63/150,422, filed on Feb. 17, 2021.

(51) Int. Cl.
*B64C 35/00* (2006.01)
*B64C 3/34* (2006.01)
(Continued)

(52) U.S. Cl.
CPC .............. *B64C 35/007* (2013.01); *B64C 3/26* (2013.01); *B64C 3/34* (2013.01); *B64C 25/54* (2013.01);
(Continued)

(58) Field of Classification Search
CPC ........ B64C 25/54; B64C 35/00; B64C 35/006
See application file for complete search history.

(56) References Cited

U.S. PATENT DOCUMENTS 1,512,912 A    10/1924   Driggs
1,816,130 A     7/1931   Sikorsky
(Continued)

FOREIGN PATENT DOCUMENTS

RU         2078002 C1    8/1996
WO       2017/149196    9/2017

OTHER PUBLICATIONS

Jeff Simon, Aircraft Maintenance: Outs and Ins of Fuel Bladder Replacement, Aug. 26, 2020, AOPA, https://www.aopa.org/news-and-media/all-news/2020/august/27/aircraft-maintenance-outs-and-ins-of-fuel-bladder-replacement (Year: 2020).*

*Primary Examiner* — Timothy D Collins
*Assistant Examiner* — Brendan Kroger Schneider
(74) *Attorney, Agent, or Firm* — K&L Gates LLP (57) ABSTRACT

The present disclosure relates to a secondary airfoil apparatus, system and method for improving lift, takeoff, landing and aerodynamic performance of a floatplane. The secondary airfoil can be integrated into the floatplane during manufacture, or retrofitted to an existing floatplane after manufacture. The secondary airfoil is itself of sufficient structural rigidity to withstand any and all forces added by the airfoil during floatplane operation. The secondary airfoil is fixedly attached between the floats of the floatplane, and are purposefully not attached to spreader bars that can exist typically between the floats. The secondary airfoil can be arranged at an optimal angle of incidence and vertical lift position relative to the primary airfoil, or wing of the aircraft, and relative to the floats center of gravity and drag for optimal maneuverability of the floatplane.

19 Claims, 8 Drawing Sheets

(51) Int. Cl.
*B64C 25/54* (2006.01)
*B64C 3/26* (2006.01)
*B64D 37/16* (2006.01)

(52) U.S. Cl.
CPC .......... *B64C 35/001* (2013.01); *B64C 35/006* (2013.01); *B64C 35/008* (2013.01); *B64D 37/16* (2013.01)

(56) References Cited

U.S. PATENT DOCUMENTS

| | | | |
|---|---|---|---|
| 1,835,371 A | 12/1931 | Bellanca | |
| 1,928,317 A | 9/1933 | Rippen | |
| 2,964,271 A | 12/1960 | Strawn | |
| 2006/0081732 A1* | 4/2006 | From | B64C 35/007 244/105 |
| 2006/0145000 A1 | 7/2006 | Hensley | |
| 2006/0255208 A1 | 11/2006 | Hawkins | |

* cited by examiner

SECONDARY AIRFOIL APPARATUS, SYSTEM, AND METHOD FOR IMPROVING LIFT AND AERODYNAMIC PERFORMANCE OF A FLOATPLANE

PRIORITY CLAIM

The present application claims the benefit of priority to, and incorporates by reference, U.S. Provisional Application No. 63/150,422, filed on Feb. 17, 2021.

BACKGROUND

This disclosure is generally directed to a secondary airfoil retrofitted to or integrated with an airplane having a pair of floats to improve lift and aerodynamic performance of the floatplane. More particularly, the disclosure is directed to an apparatus, system and method for more securely attaching the secondary airfoil to the pair of floats and utilizing the strength of the secondary airfoil itself to withstand forces that occur during takeoff, landing and maneuvering of the floatplane.

Floatplanes, which include seaplanes and amphibious aircraft, generally include a pair of floats designed for takeoff and landing on water. The addition of a pair of floats beneath the floatplane can increase the weight of the aircraft. Aircraft are constrained by limits on their maximal loads, and the additional weight of floats limit payload and fuel capacity and can lengthen the takeoff distance.

WO2017149196 discloses a floatplane including a fuselage, a primary wing, and a float arrangement including a number of floats, with an option of a third float directly under the fuselage. The two lateral floats are attached to the fuselage by secondary wing structures at an angle dependent on a height above the water needed for the propeller to clear the water. The secondary airfoils are not co-linear with the primary airfoil. The design does not provide a mechanism to add a secondary airfoil to current dual float seaplane designs. The airfoils are placed at an angle dependent on the height needed for a propeller to clear the water; this can be 45 to 60 degrees. This reduces the effective lift, which is orthogonal to the plane of the airfoil. This lift calculation is independent of ground effect, which serves to increase lift even further: vertical lift is 50% of the total lift generated at 45 degrees orientation, and 34% of total lift generated at 60 degrees orientation. By placing the airfoils at an angle, the height above water is increased, and therefore lift is decreased as compared to the present invention.

US20060081732A1 discloses an airfoil that attaches to the spreader bars of a conventional two-float seaplane. The primary goal of the airfoil is to function as a faring over the spreader bars and thus reduce drag. A secondary effect of the airfoil is to generate lift. The airfoil is prevented from rotating as it generates lift. This design can be added on to any float configuration with spreader bars, although the airfoil is not attached to the floats. The height is set by the spreader bars and cannot be adjusted up or down to optimize ground effect or minimize water drag. In addition, the spreader bars are not designed to carry a radial load introduced by airfoil lift. The airfoil has very limited ability if at all to adjust angle of incidence since the airfoil is suspended by spreader bars in a fixed plane and this results in limitations on the lift of the airfoil especially at low airspeeds. The airfoil is not attached to the floats, which are designed to carry the entire load of the aircraft when landing and taking off, but are connected to the spreader bars, which are not designed to carry the load created by the secondary airfoil. When taking off, the full load is transferred from the wheels to the primary and secondary airfoils, and the secondary airfoil in the air only transmits a fraction of the load carried by the floats on the ground. Since the airfoil's attachment is determined by the location of the spreader bars, the position of the secondary airfoil is not adjustable along the longitudinal axis of the fuselage to allow the combined pitching moment of the primary and secondary airfoils to be balanced by the horizontal stabilizer and allow for stable aerodynamics. The position of the secondary airfoil cannot replace the function of the spreader bars to maintain the floats equidistant and thus allow elimination of a spreader bar and its drag.

U.S. Pat. No. 1,512,912A discloses the use of an additional airfoil with a single or double float seaplane to allow retraction of the landing gear into an aerodynamic structure. With the airfoil inches away from the water above the waterline, it is not a practical solution in rough water. The position of the airfoil is determined by the location of the landing gear, not the center of lift of the primary airfoils. The lifting moment does not appear to be co-linear with the primary airfoils, indicating that there is lift but there is no ability to adjust the position to match primary airfoil center of lift.

U.S. Pat. No. 1,816,130A discloses the addition of a fuel tank to the primary airfoil. The biplane configuration for a flying boat with small wing pontoons is used to stabilize the plane in the water and prevent contact between wingtips and water. The floatwing is designed for a two-pontoon system. The fuel tank is described to be present in the primary airfoil.

U.S. Pat. No. 1,835,371A relates to a landing gear for a combination land and sea plane with primary and secondary airfoils which attach to the float. The secondary airfoil is the attachment point for dual floats and attaches to the fuselage, and the primary and secondary airfoils centers of lift are co-linear. The secondary airfoil extends beyond the floats and attaches to the undersurface of the primary airfoil. The design lacks a mechanism to add a secondary airfoil to a conventional two float seaplane or a means to adjust the height of the float above the water due to the integral design of primary and secondary airfoils attaching to the float.

U.S. Pat. No. 1,928,317A discloses an integral design with two floats attached to one another via an airfoil, which also functions as cabin. Lateral airfoils that house the engines also extend from the float structure. This design also lacks a mechanism to add a secondary airfoil to the current dual float seaplane design.

U.S. Pat. No. 2,964,271A discloses an integral design with a secondary airfoil between dual floats with a mechanism to retract landing gear into the secondary airfoil. The secondary airfoil is provided in lieu of spreader bars, which are not part of this design. This design also lacks a mechanism to add a secondary airfoil to the current dual float seaplane design. The secondary airfoil is not watertight since it houses the landing gear and will be less buoyant in the event of an accident. There is no means to adjust the height of the float above the water, as the float is integral with the design rather than attached thereto. The position of the primary and secondary airfoil appear to be off-center of lift. More specifically, the position of the secondary airfoil to house the landing gear restricts the ability to place the center of lift of the secondary airfoil in a position to be co-linear with the center of lift of the primary airfoil.

US20060145000A1 discloses an integral design with two fuselages that function as floats and are connected to each other by both a primary airfoil on top of the fuselage/float and by a secondary airfoil between the fuselage/float. The secondary airfoil provides the source of lift. This design also lacks a mechanism to add a secondary airfoil to the current dual float seaplane design.

US20060255208A1 discloses an integral design of a flying boat monohull design with side sponsons with pontoons for stability. The sponson provides buoyancy and a place for passengers to stand. This design also lacks a mechanism to add a secondary airfoil to the conventional dual float seaplane design.

RU2078002C1 discloses a ground effect craft with the primary airfoil on the top of the fuselage and a lift-producing airfoil in contact with the lower fuselage to connect to two floats. Like many designs noted above, this design also lacks a mechanism to add a secondary airfoil to the current dual float seaplane design.

A need exists in improving the lift of a floatplane to increase its load carrying capacity, its aerodynamic performance, takeoff and landing safety, and its fuel reserve for longer, more stable and safer maneuvering during flight.

SUMMARY

To meet the needs noted above, the present disclosure provides a secondary airfoil that is retrofitted onto an existing floatplane, or integrated into the floatplane during floatplane manufacture. The secondary airfoil is labeled "secondary" so as not to confuse it with the primary airfoil, which is the wing or wings of the airplane. The airplane includes a primary airfoil as part of its manufacture. When constructing a floatplane hereof, the airplane equipped with the primary airfoil is mounted on floats. The floats arrive as a pair and are held a spaced distance apart by what is known in the industry as a spacer or spreader bar that is coupled to and secures the pair of floats in place. The floatplane is therefore an airplane placed on the pair of floats held apart by the spacer bar. A secondary airfoil is placed below the primary airfoil and between the pair of floats to improve lift and aerodynamic performance of the floatplane.

The secondary airfoil is preferably composed of metal or composite material of sufficient strength to not only provide additional lift to the floatplane but also to withstand any forces applied thereto during takeoff, landing, and maneuvering. The body of the airfoil has enough strength by itself so that the spreader bars typically coupled to the floats to maintain space between the floats are not needed. However, if spacer bars are already present, the secondary airfoil hereof is designed to retrofit around and between the spacer bars, but are purposefully not secured to the spacer bars. Unlike the secondary airfoil, the spacer bar has insufficient strength to withstand radial forces created by the added lift of the secondary airfoil. Therefore, the secondary airfoil is used not only as structural support to maintain spacing between the pair of floats, but also can withstand any forces applied to the secondary airfoil, the floats, the airplane, and the primary airfoil of the airplane during takeoff, during landing, or at any time between takeoff and landing.

The secondary airfoil apparatus includes an airfoil having a front end, a trailing end, and opposed side surfaces. In some embodiments, the secondary airfoil can be made of a substantially watertight airfoil skin surrounding a plurality of ribs. The ribs can be spaced from each other and extend substantially parallel to the opposed exterior side surfaces of the secondary airfoil.

In some embodiments, the plurality of ribs includes a first set of leading ribs and a corresponding second set of trailing ribs spaced apart by an opening extending in an orthogonal direction through the ribs surfaces as well as through the opposed exterior side surfaces. Front edges of the first set of leading ribs are positioned within the front end of the secondary airfoil and rear edges of the first set of leading ribs contact a first spar. Front edges of the second set of trailing ribs contact a second spar, and rear edges of the second set of trailing ribs are positioned within the trailing end of the secondary airfoil. The opening is defined by a spacing of the first and second spars and is dimensioned to surround a spreader bar by a sufficiently spaced distance so the spreader bar does not contact the ribs or the secondary airfoil when forces are applied to the secondary airfoil.

The secondary airfoil apparatus also includes at least one pair of attachment arms extending from the opposed exterior side surfaces toward the float(s). The attachment arms include first and second opposing ends, with the first end secured to the respective exterior side surface. In some embodiments, the first ends connect to the exterior side surface of the secondary airfoil through one and more brackets with nuts and bolts, through a permanent welding of the attachment arm to a bracket, or any other suitable means. The second end of the attachment arm attaches to an inward facing surface of a pair of spaced floats at an attachment point. The attachment point includes a mounting member such as a bracket and at least one nut and bolt, with the bolt extending through an opening in the attachment arm.

According to another example, a system is provided for improving lift and aerodynamic performance of a floatplane. The system includes a pair of spaced floats. Each of the pair of spaced floats includes an upper surface. A pair of mounting members can be secured to the upper surfaces of the respective pair of spaced floats. The system also includes the secondary airfoil. A pair of attachment arms extend in opposite directions from respective opposed exterior side surfaces of the secondary airfoil and toward the spaced floats for fixedly connecting the secondary airfoil between the pair of spaced floats.

The secondary airfoil is preferably arranged vertically below the primary airfoil of the airplane or floatplane and horizontally between but not coupled to horizontally extending spreader bars. The pair of mounting members can each comprise a mounting member opening aligned with an opening at the second end of each attachment arm. The secondary airfoil is configured with a center of lift secondary airfoil axis that is substantially orthogonal to an upper and lower outer surfaces of the secondary airfoil. The center of lift secondary airfoil axis is approximately co-linear with a center of lift primary airfoil axis of a primary airfoil of the floatplane. The secondary airfoil can also include a cavity arranged entirely within the secondary airfoil. A collapsible fuel bladder is preferably configured within the cavity, and a fuel delivery system can be configured to deliver fuel from the fuel bladder to the floatplane.

According to another example, a method is provided for improving lift and aerodynamic performance of a floatplane. The method includes securing a secondary airfoil between a pair of floats, and particularly securing the secondary airfoil between upper surfaces of a first float and a second float. The method further includes connecting a first set of spaced mounting members to the upper surface of the first float, and connecting a second set of spaced mounting members to the upper surface of the second float. A first set of attachment arms connect to a first sidewall surface of the secondary airfoil, while a second set of attachment arms connect to a second sidewall surface of the secondary airfoil. The first set of mounting members connect to the first set of attachment arms, while the second set of mounting members connect to the second set of attachment arms.

Additional features and advantages of the disclosed apparatus, system and method are described in, and will be apparent from, the following detailed description and figures. The features and advantages described herein are not all-inclusive and, in particular, many additional features and advantages will be apparent to one of ordinary skill in the art in view of the figures and description. Also, any particular embodiment does not have to have all of the advantages listed herein. Moreover, it should be noted that the language used in the specification has been selected for readability and instructional purposes, and not to limit the scope of the inventive subject matter.

BRIEF DESCRIPTION OF THE FIGURES

Understanding that figures depict only typical embodiments of the invention and are not to be considered to be limiting the scope of the present disclosure, the present disclosure is described and explained with additional specificity and detail through the use of the accompanying figures. The figures are listed below.

DETAILED DESCRIPTION

Certain embodiments described herein relate generally to a secondary airfoil for improving lift, aerodynamic performance, range and safety of a floatplane. Conventional floatplanes that utilize a secondary airfoil generally connect the secondary airfoil to the spreader bar. Since the spreader bar functions to maintain spacing of the floats, the spreader bar is not designed to handle the added forces incurred by the secondary airfoil. For example, the radial load of the secondary airfoil can incur up to +3.5 Gs and −1.8 Gs under certain maneuvers. Those radial loads are transferred to the long axis of the spreader bar, causing bending and failure under even modest flight-testing conditions. Spreader bar failures increase during landing when there will be not only a radial force on the spreader bar, or attachment points, but also compressive forces due to the floats contacting the surface of the water, especially in a crosswind landing on one float. Normal aerodynamic maneuvering in flight or during landing can therefore create an unsafe failure to the secondary airfoil, and mainly to the spreader bar and its attachment points.

Conventional designs therefore fail to transmit secondary airfoil lift to the proper load bearing structure, which is the floats and not the spreader bar or struts attached to the floats. Other conventional designs attempt to integrate the secondary airfoil to the floats. However, these designs integrate the secondary airfoil flush with the top of the floats and within several inches of the waterline. The resulting floatplane has rather poor performance when attempting to takeoff or land in rough water due to contact with the water. In addition, the integral airfoil-float design reflects only one solution to the position of the secondary airfoil between the floats. The position of the secondary airfoil cannot be adjusted to match the airplane's center of gravity or change the angle of incidence. The angle of incidence of an airfoil is a critical feature determining the lift especially at low speeds of take-off and landing. This type of design, being integral with the floatplane, does not have a method to customize the position of the airfoil, or attach to existing floats of a more advantageous retrofit design. The position of the secondary airfoil has a unique solution for each aircraft because the float center of buoyancy determines where the floats are attached to the aircraft near its center of gravity. The secondary airfoil is attached to the floats to approximately match the center of lift of the primary airfoil; the exact position of the secondary airfoil will be determined by analysis of the sum of the moments about the aircraft center of gravity of the secondary airfoil and horizontal stabilizer, both of which create lift about the center of gravity. For this reason, the ability to adjust the location of the secondary airfoil to match the aerodynamics of the aircraft is critical and is not a feature of the integral design previously described.

Figure 1:
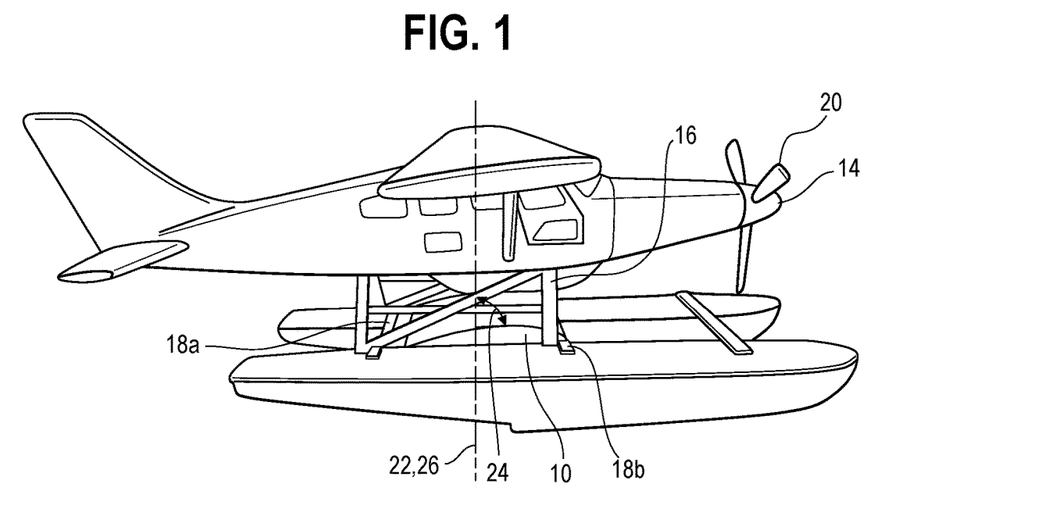
FIG. 1 is a perspective view of a secondary airfoil apparatus on a floatplane below the primary airfoil and between a pair of floats.

Referring now to the FIG. 1, the present embodiment is shown in which a secondary airfoil 10 of sufficient strength in and of itself to withstand its added lift (takeoff, landing and in flight maneuvering) is attached directly to a pair of floats 12a and 12b of a floatplane 20. Floats 12a and 12b are designed to carry the entire weight of the airplane 14 of floatplane 20. Since the airplane 14 is connected via struts 16 to floats 12a and 12b, the lift of the secondary airfoil 10 will be transmitted directly to the airplane 14.

In the embodiments of FIGS. 1-9, the secondary airfoil 10 does not attach to horizontal spreader bars 18 (or bars 18a, 18b, 18c) since the bars 18 are not designed to carry a load perpendicular to the long axis running between the floats. The mechanical strength of the attachment points 31 of the secondary airfoil 10 is determined by the calculated maximal load created by the secondary airfoil 10 under standard flight-testing conditions. Attachment of the secondary airfoil 10 to the floats 12 can be set at a height above the waterline to minimize the risk of water contact with the secondary airfoil 10. As shown, the secondary airfoil 10 is configured vertically below the primary airfoil 19, and horizontally between and not coupled to spreader bars 18 that extend horizontally between the pair of spaced floats 12a, 12b.

Figure 2:
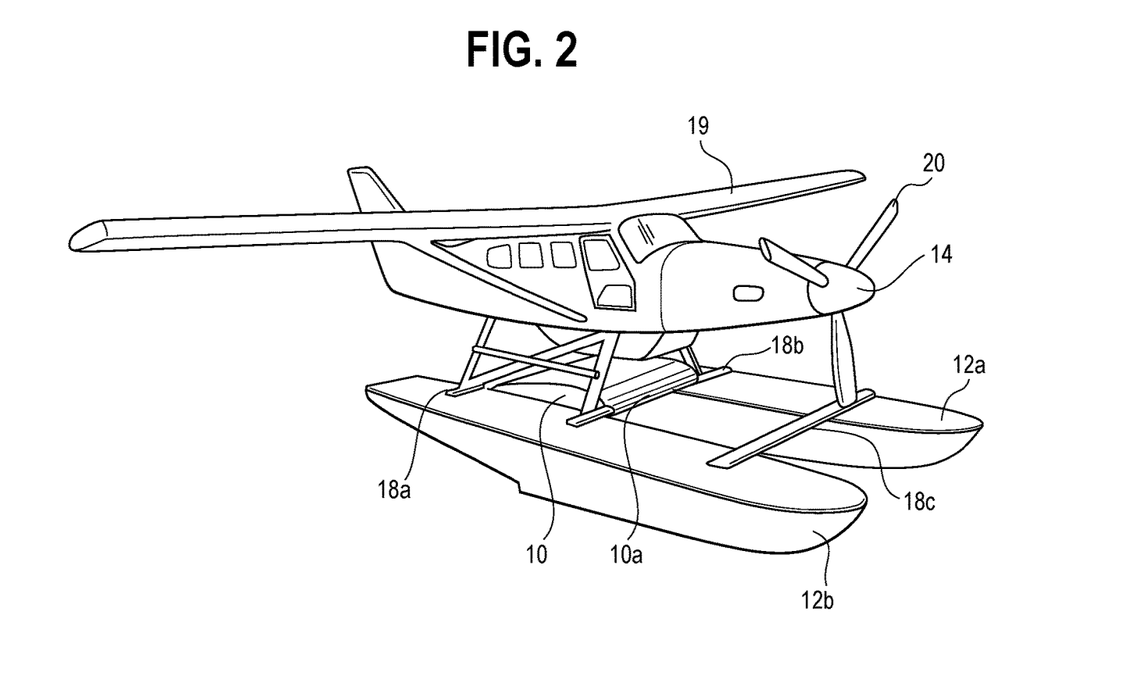
FIG. 2 is a perspective view of a further embodiment of a secondary airfoil apparatus on a floatplane below the primary airfoil and between a pair of floats, with the secondary airfoil surrounding a spreader bar.

The secondary airfoil 10 is configured with a center of lift secondary airfoil axis 22 that is substantially orthogonal 24 to an upper and lower outer surfaces of the secondary airfoil 10. The center of lift secondary airfoil axis 22 is co-linear with a center of lift primary airfoil axis 26 of primary airfoil 19 of the floatplane 20. The co-linear centers of lift 22, 26 are not dependent on the placement of the spreader bars 18 since the secondary airfoil 10 can be connected anywhere along floats 12a, 12b. The position of the leading edge 10a of the secondary airfoil 10 will be spaced from a spreader bar 18 and/or the floats relative to the airframe to avoid interruption of laminar flow required to produce lift in the airfoil 10. The position of airfoil 10 under the center of lift 26 of the primary airfoil 19 may require that the secondary airfoil 10 incorporate the spreader bar 18 within the airfoil 10 in a non-load bearing manner so that the secondary airfoil 10 is not rigidly secured to spreader bar 18. An example of such is shown in FIG. 2, with the leading edge 10a of airfoil 10 surrounding spreader bar 18b, but not connected thereto. The design shown in FIGS. 1 and 2 can be constructed or integrated into an original design of the floatplane 20, or as an aftermarket retrofit onto a pre-existing design of the floatplane 20 having, for example, pre-existing spreader bars 18.

The addition of secondary airfoil 10 not only increases the load carried by the floatplane 20, but also increases safety by shortening takeoff and landing distances. The safety reserve of increased lift at low airspeeds at take-off and landing is determined in part by choosing the optimal angle of incidence, which this design allows. The increased lift results in a lower stall speed which allows the aircraft to get airborne at a lower speed which dramatically decreases the time the floatplane 20 is exposed to the high drag of the floats in the water. Takeoff distance is also shortened by minimizing the contact of water with the airfoil 10 by elevating the airfoil 10, via its mechanical attachments to the inside, upper surfaces of the floats 12, to a height above the waterline to minimize water drag problems in rough water.

The present design provides a mechanically sound attachment of the secondary airfoil 10 to the floatplane 20 through the floats 12a, 12b and mechanical attachments to reduce the risk of catastrophic mechanical failure of the airfoil 10. In the embodiment shown in FIGS. 3-9, the airfoil 10 attaches to floats 12a, 12b between and around the rear, middle, and front spreader bars 18a, 18b and 18c, respectively.

Figure 3:
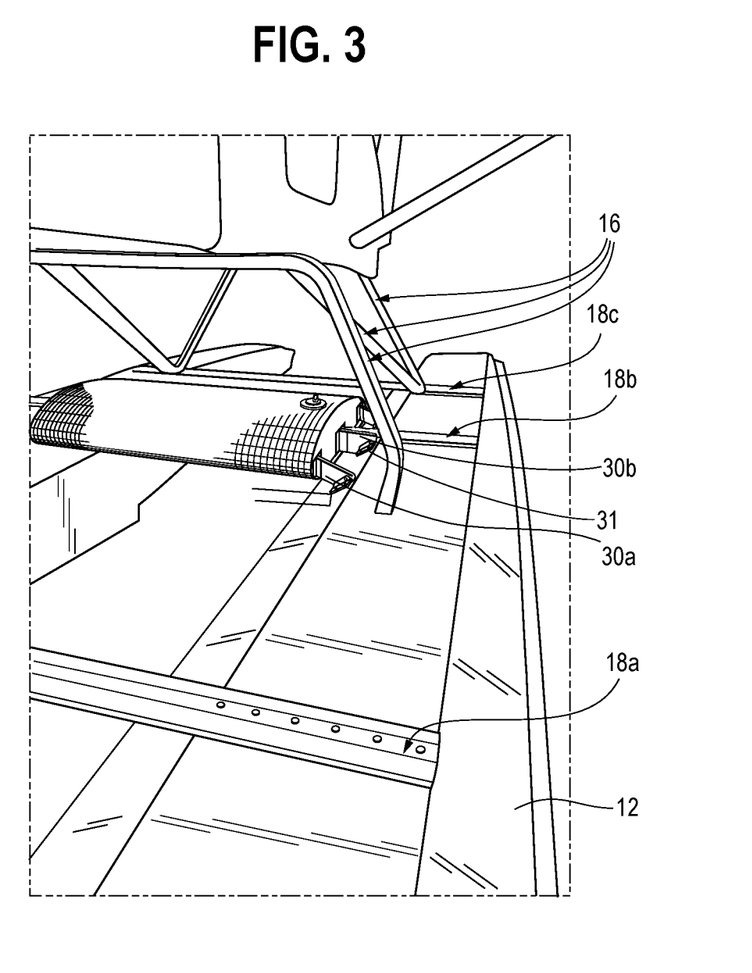
FIG. 3 is a front perspective right side view of a further embodiment of a secondary airfoil apparatus secured between upper surfaces of a pair of floats of a floatplane.

Referring to FIG. 3, front and middle attachment arms 30c and 30b span from an exterior side surface 32 of the airfoil 10 to the respective float 12a, 12b. Arms 30 extend toward an inside surface of a float 12a, 12b, and attach to an upper surface of the respective float 12. The attachment points 31 of the arms 30 can be shifted laterally along the float 12 to match the center of lift of the primary airfoil 19. The attachment points 31, and thus the airfoil 10 position between the floats 12, can be selected to match the primary airfoil 19 center of lift 26. This allows the position of airfoil 10 to be independent of the position of the floats 12, since the floats 12 must be positioned near the axial center of gravity of the floatplane 20.

Airfoil 10 can also be mounted at a variable height above the waterline by raising or lowering the attachment point on the floats 12. The design allows for selecting the height above the water to allow the balancing of two opposing considerations: an increase in lift due to ground effect when closer to the water and the increased likelihood of water drag when it is too close. The attachment arms 30 can therefore be adjusted at different angles upward or downward, either in the arm itself or at the attachment to mounting members secured to the upper surfaces of the floats 12.

Figure 4:
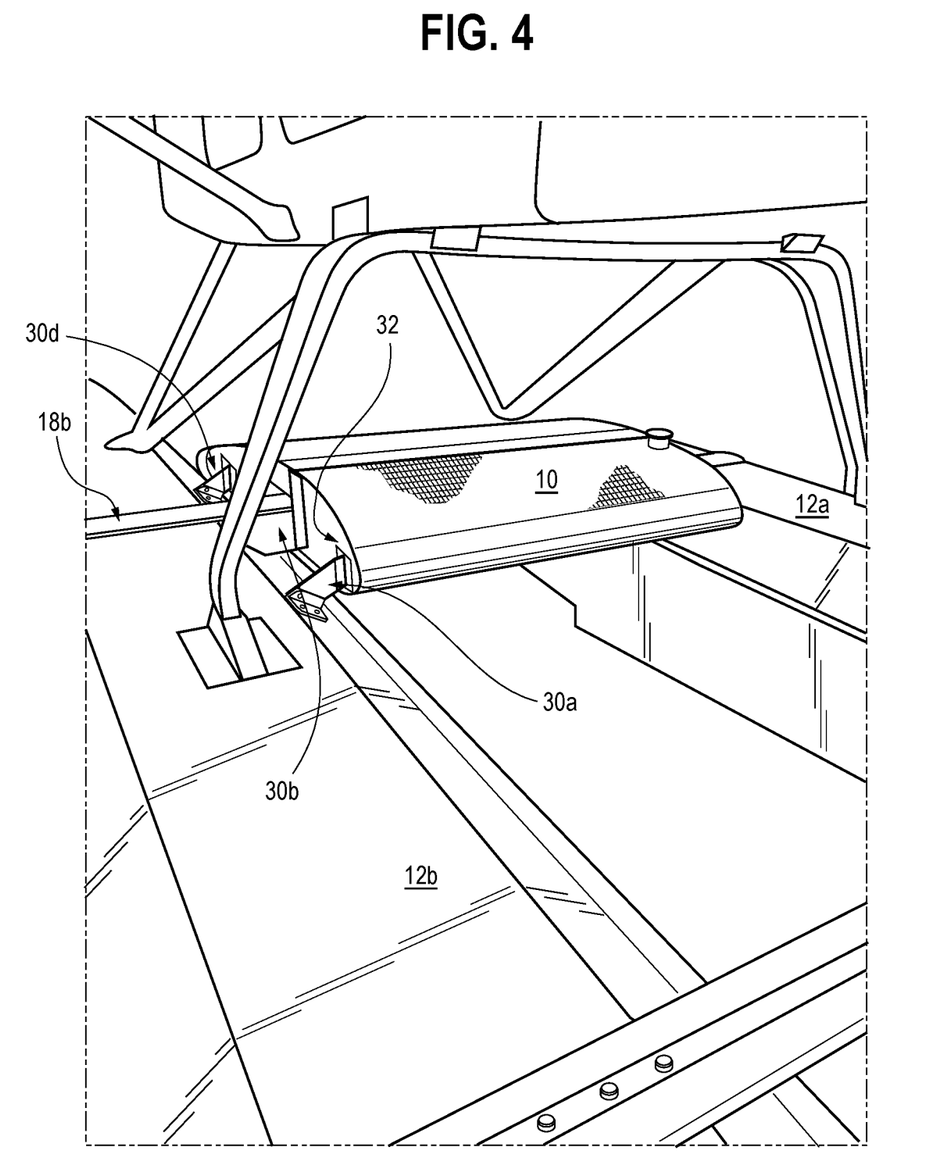
FIG. 4 is a front perspective left side view of the secondary airfoil apparatus of FIG. 3.
Figure 5:
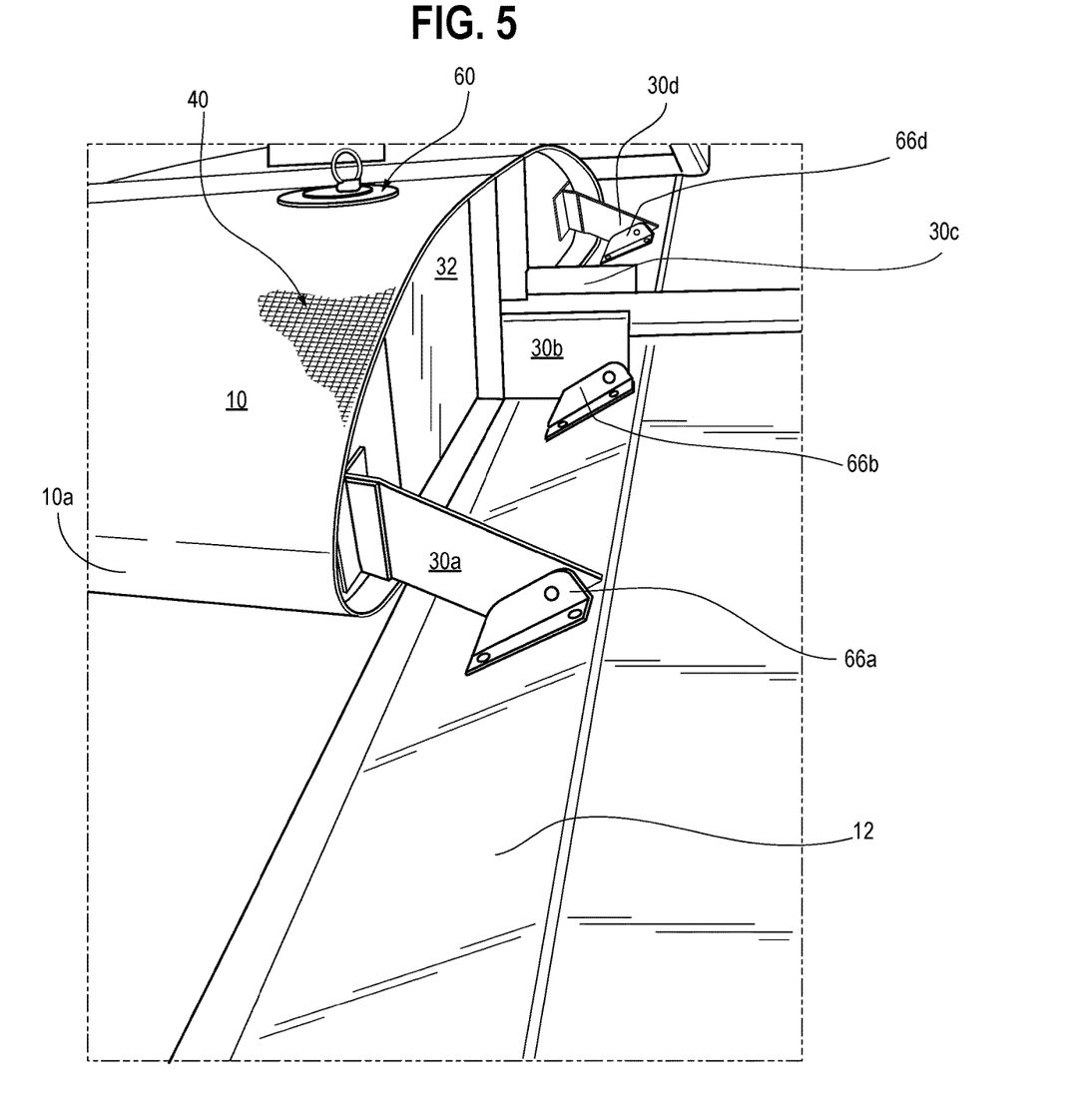
FIG. 5 is an enlarged front perspective right side view of the secondary airfoil apparatus of FIG. 3.

FIGS. 4 and 5 illustrate in more detail in a front view alongside the space between the floats 12, with the airfoil 10 arranged between the floats 12. The leading edge 10a of the airfoil 10 is shown. Airfoil 10 is arranged a spaced distance around middle spreader bar 18b and behind forward spacer bar 18c. An exterior side surface 32 of secondary airfoil 10 is shown having a middle spreader bar 18b in front of a trailing portion 10b of the airfoil 10. Front and middle attachment arms 30a, 30b, 30c attach front and middle portions of airfoil 10, and a rearward attachment arm 30d attaches a rear portion of airfoil 10.

A front attachment arm 30a is shown coupling a forward portion of the airfoil 10 to the float 12. Middle attachment arms 30b, 30c is shown coupling a middle portion of the airfoil 10, and a rear attachment arm 30d is shown coupling a rear portion of the airfoil. The attachments include corresponding forward attachment arm 30c, middle attachment arm 30b and rear attachment arm 30a. Attachment arms 30 extend from opposed exterior side surfaces of the secondary airfoil. The middle attachment arms 30b, 30c couple around a spreader bar 18, as well as around an opening 34 described in greater detail below. In the illustrated embodiment, a fuel tank opening 60 is shown. Fuel tank opening 60 extends into a cavity within the secondary airfoil, and specifically into a fuel tank within that cavity.

Figure 6:
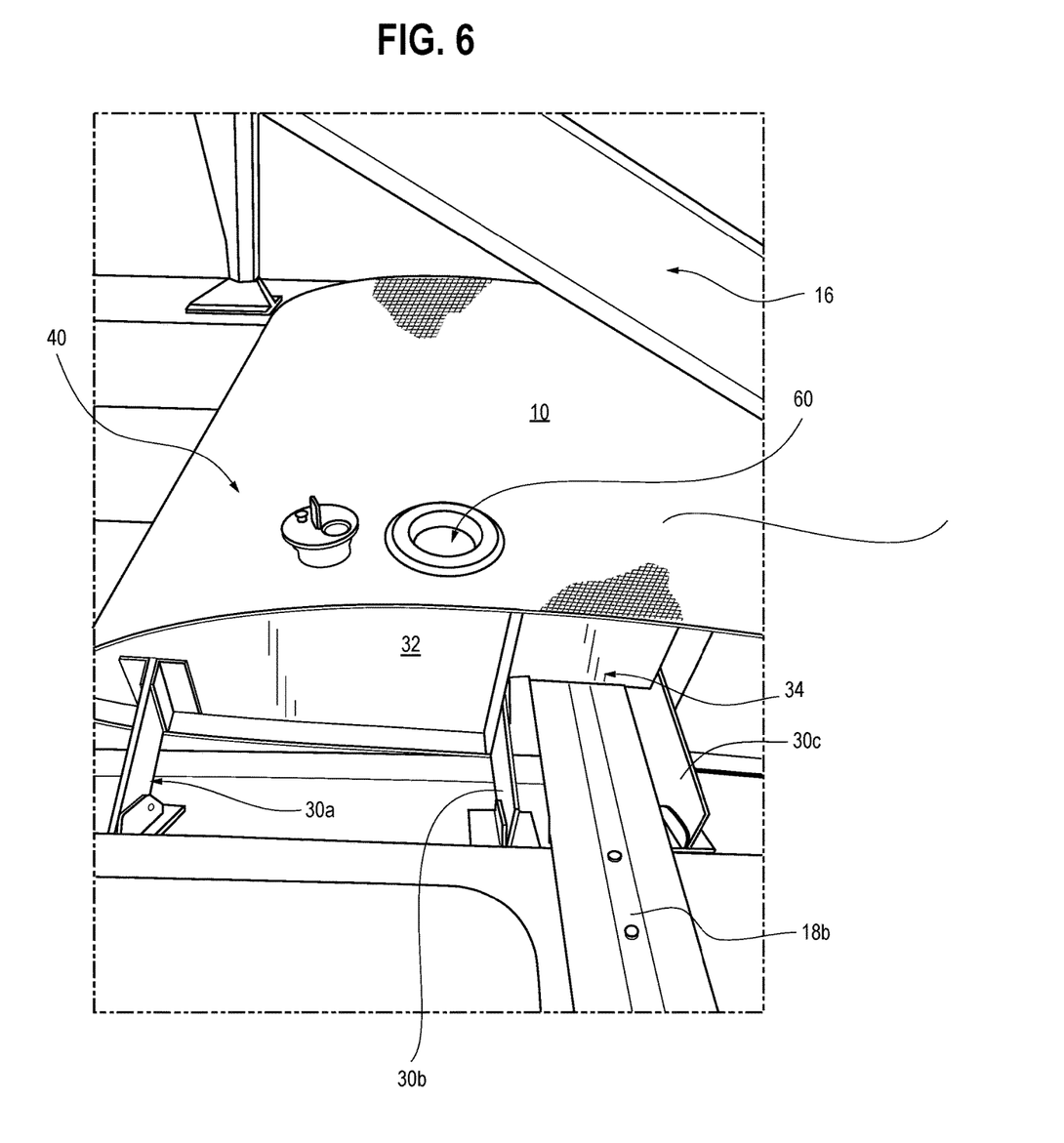
FIG. 6 is an enlarged ride side perspective view of the secondary airfoil apparatus of FIG. 3.

Referring to FIG. 6, a partition or opening 34 extending through the airfoil 10, spanning the side surfaces 32 of the airfoil 10, and positioned between the leading and trailing portions 10a, 10b of airfoil 10 allows spaced passage of middle spreader bar 18b without attachment of the spreader bar 18b to airfoil 10. In other embodiments, the airfoil 10 does not include the opening 34. In some embodiments, the airfoil 10 includes more than one opening 34 to accommodate multiple spreader bars 18.

The opening 34 extends through the spaced set of leading and trailing ribs 44 that extend from the leading edge 10a to the trailing edge 10b of secondary airfoil 10. Airfoil skin 40 surrounds the leading and trailing portions and the opening created between the leading and trailing portions. The opening 34 extends between the opposed side surfaces 50 of airfoil 10, and between leading edge spar 46a of leading portion 50a and trailing edge spar 46b of trailing portion 50b, as discussed in greater detail below. A spacer bar 18 connected to an upper surface of a pair of floats extend from one float to another transversely through the opening 34 of the secondary airfoil 10 and opposed side surfaces 62 thereof.

Referring to FIG. 5, each attachment arm 30 extends to a terminating attachment point at the distal end of the arm 30. The attachment point can include an opening that can be aligned with an opening within a corresponding mounting member 66. A forward mounting member 66a is aligned with and couples to forward attachment arm 30a, whereas a middle mounting member 66b is aligned with and couples to middle attachment arm 30b. There can be multiple attachment arms 30 and corresponding mounting members 66, beyond two or three as shown. Attachment arms 30 extending from both opposed exterior side surfaces, and mounting members 66 extend from both floats 12 of the pair of floats. The openings within the attachment arms 30 and the mounting members 66 can be aligned with a bolt or rivet extending through the openings to securely connect the arms 30 to members 66. The arms 30 can be welded or secured in other ways to the exterior side surface 32. The members 66 can also be welded to secured in other ways to an upper, inward facing surface of floats 12. The mounting members can also receive mechanical reinforcement within the float structure as determined by engineering analysis of the load bearing capacity of the float attachment point and the calculated load of the airfoil. As shown, members 66 can be bolted or riveted to floats 12.

In some embodiments, the trailing end of the trailing portion 10b of airfoil 10 can accommodate mechanically or electrically moveable flaps to adjust the trim and lift in a variable manner, if needed. The rear spreader bar 18a is spaced behind the flaps a sufficiently spaced distance so as to not interfere with the laminar flow created by the airfoil 10 and/or flaps 38. In some embodiments, the secondary airfoil apparatus includes the secondary airfoil 10 with front attachment arms 30a, one or more middle attachment arms 30b, and flaps on the side surface 32 of the airfoil 10 in lieu of the rear attachment arms 30d as shown in FIG. 5.

Figure 7:
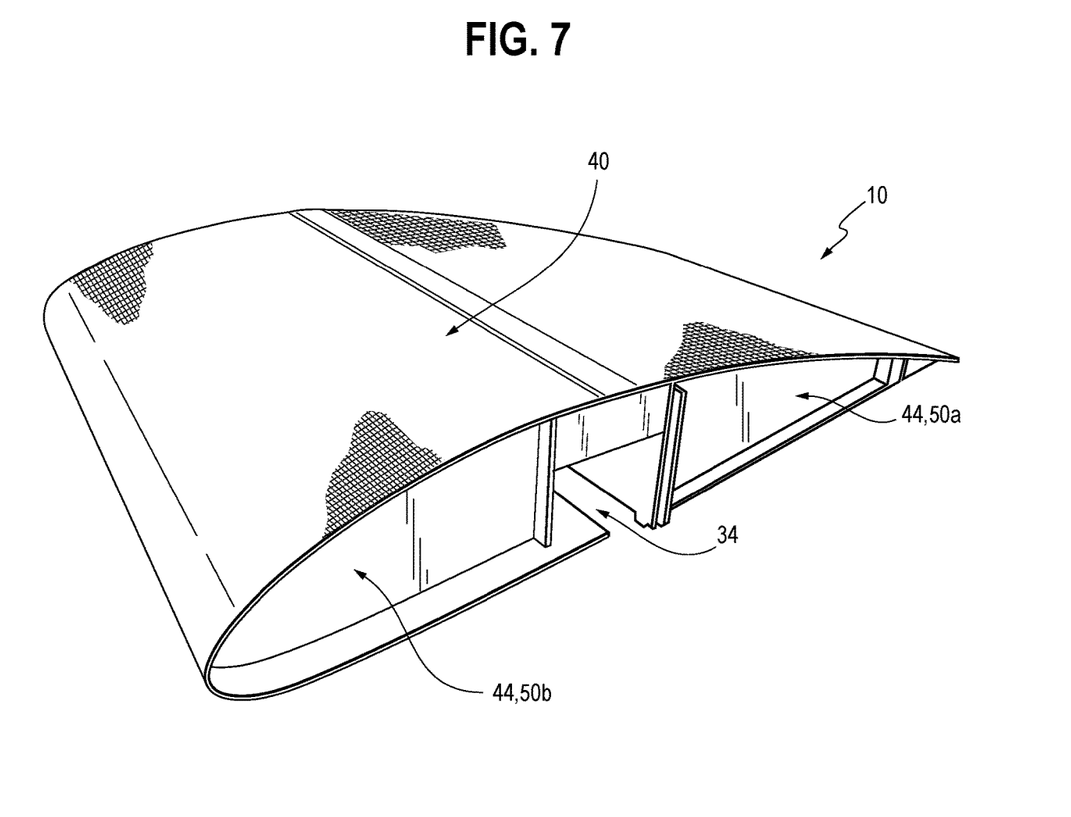
FIG. 7 is a perspective view of the secondary airfoil of the secondary airfoil apparatus of FIG. 3.
Figure 8:
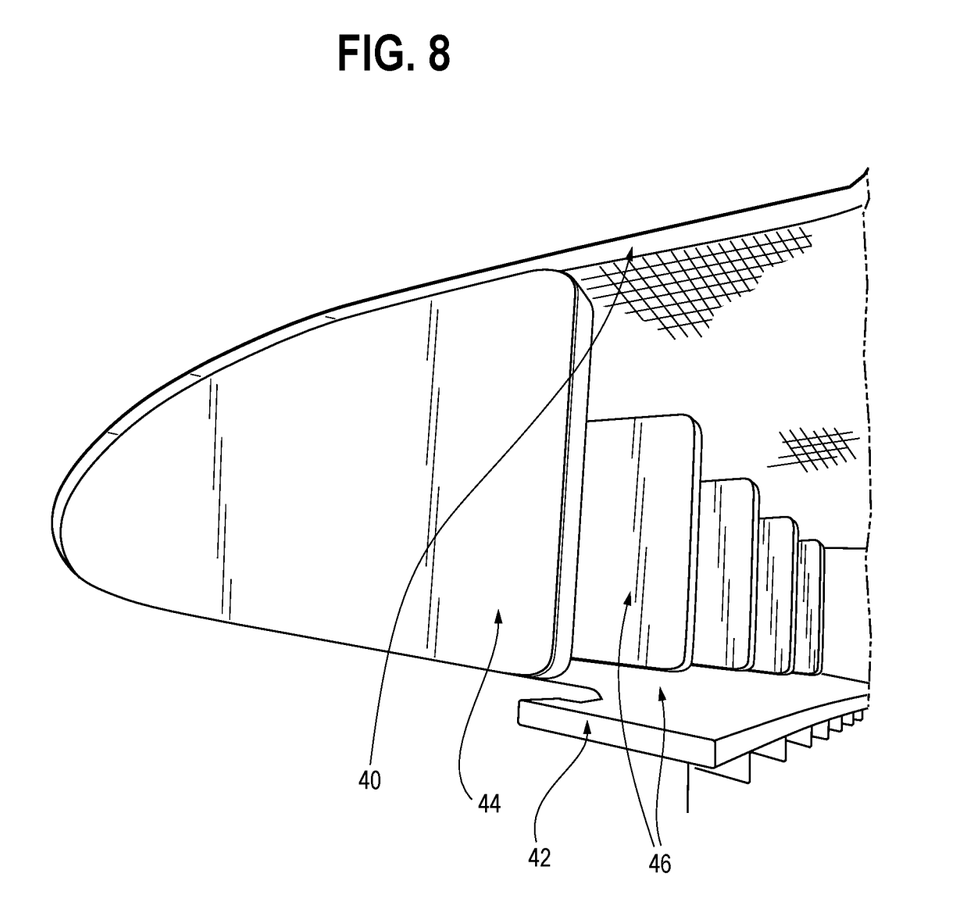
FIG. 8 is a perspective view of an interior of a front end of the secondary airfoil of the secondary airfoil apparatus of FIG. 3.
Figure 9:
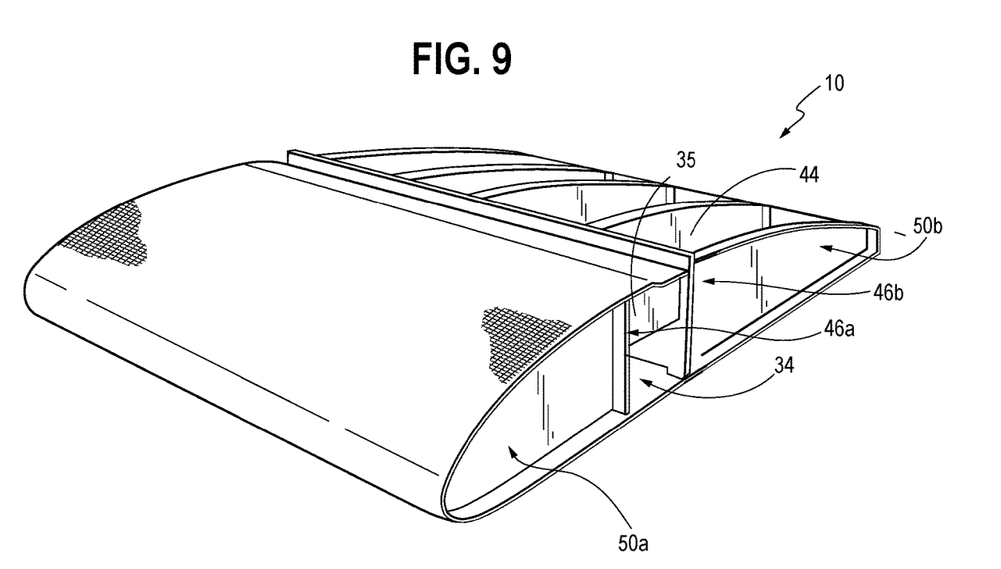
FIG. 9 is a perspective view of an interior of a trailing end of the secondary airfoil of the secondary airfoil apparatus of FIG. 3.

FIGS. 7-9 illustrate the construction and components of secondary airfoil 10. Airfoil skin 40 can be made of a composite material interlaced with a metal, wire or nylon-type mesh to produce a watertight secondary airfoil 10 that can be produced in portions. The side view of FIG. 8 is of a partially constructed leading edge portion 10a of the airfoil 10 shown containing a series of ribs 44 arranged within the molded airfoil skin 40. Between a pair of ribs 44 is a space 46. The space 46 accommodates an opening created through the airfoil 10 into which a spacer bar is placed.

FIG. 9 illustrates a top partially constructed trailing portion 10b of secondary airfoil 10. Ribs 44 extend as tapered opposed planar surfaces from a front spar 46b to the trailing end 10b. The ribs 44 and spars 46 are surrounded entirely in a watertight skin 40. FIG. 9 shows a leading portion 50a coupled to a trailing portion 50b, with an opening 34 between the spar 46a of the leading portion 50a and the spar 46b of the trailing portion 50b. On each side surface 32, a lateral member 35 is provided between the front and rear spars 46a, 46b to provide additional structural support between the leading portion 50a and the trailing portion 50b for the secondary airfoil 10. In some embodiments, lateral ends of the spars 46a, 46b extend beyond the side surface 32 and the lateral member 35, while in other embodiments, the lateral ends of the spars 46a, 46b are flush with the side surface 32 and the lateral member 35.

In contrast to WO2017049196, the presently described floatwing design can be attached to any conventional dual float seaplane and is customizable to accommodate any existing primary airfoil center of lift, float center of gravity, and aircraft center of gravity. The ground effect may be maximized by lowering the height above the water, as the ground effect increases dramatically when close to the ground or water. The angle of incidence of the airfoil can be selected to the optimal angle for maximal low airspeed lift for each type of two float aircraft. The design allows for a reduction in water drag by raising the secondary airfoil to a height suitable for the aircraft and likely water conditions. The angle of incidence can be adjusted to match the need for increased lift, balancing the negative effect this might have by increasing drag. Flaps can be added to the design to further increase the angle of attack when landing/taking off and further increasing ground effect lift and shorten takeoff distance. The position of the airfoil can be adjusted to optimize the competing factors affecting the aerodynamics of the secondary airfoil; the secondary airfoil position over the center of gravity of the floats and relative to the primary airfoil result in combined pitching moment of the primary and secondary airfoils balanced by the lift on the horizontal stabilizer.

In contrast to U.S. Pat. No. 1,512,912A, the presently described floatwing design provides an airtight airfoil which can function as safety floatation in an accident. The present design includes an attachment mechanism that allows placement of the airfoil so that it matches the location of the center of lift, attachment which allows transmission of lift to the floats, and placement of the airfoil at a sufficient height above the waterline to avoid water drag on the waterfoil during takeoff.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed, or as retrofit elements, may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

As used herein and in the appended claims, the singular form of a word includes the plural, unless the context clearly dictates otherwise. Thus, the references "a," "an" and "the" are generally inclusive of the plurals of the respective terms. For example, reference to "a feature" can include a plurality of such features. The term "and/or" used in the context of "X and/or Y" should be interpreted as "X," or "Y," or "X and Y.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples). Further, as utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed (e.g., within plus or minus five percent of a given angle or other value) are considered to be within the scope of the invention as recited in the appended claims. The term "approximately" when used with respect to values means plus or minus five percent of the associated value.

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims.

Without further elaboration, it is believed that one skilled in the art can use the preceding description to utilize the claimed inventions to their fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles discussed. In other words, various modifications and improvements of the embodiments specifically disclosed in the description above are within the scope of the appended claims. For example, any suitable combination of features of the various embodiments described is contemplated.

What is claimed is:

1. A secondary airfoil apparatus for use on a floatplane, the floatplane including one or more primary airfoils and a pair of floats, the secondary airfoil apparatus comprising:
    an airfoil including a front end, a trailing end, and opposed exterior side surfaces, each exterior side surface adjacent to a float and having a length; and
    a plurality of pairs of attachment arms, each pair of attachment arms extending from the opposed exterior side surfaces and terminating at a respective pair of attachment points on the adjacent float, the plurality of pairs of attachment arms spaced along the lengths of the side surfaces;
    wherein the airfoil is not attached to a spreader bar.

2. The secondary airfoil apparatus of claim 1, wherein the opposed side surfaces are substantially planar and parallel to each other.

3. The secondary airfoil apparatus of claim 1, wherein each of the attachment points comprises an opening through which a bolt or rivet is placed to secure the secondary airfoil apparatus to a pair of floats.

4. The secondary airfoil apparatus of claim 1, further comprising a substantially watertight airfoil skin surrounding a plurality of ribs spaced from each other and extending substantially parallel to the opposed exterior side surfaces.

5. The secondary airfoil apparatus of claim 4, further comprising an opening within each of the plurality of spaced ribs, wherein the opening is configured to surround a spreader bar by a spaced distance.

6. The secondary airfoil apparatus of claim 4, further comprising a cavity containing a collapsible fuel bladder.

7. The secondary airfoil apparatus of claim 4, further comprising an opening spanning the opposing exterior side surfaces between a leading edge rib coupled to a leading edge spar and a trailing edge rib coupled to a trailing edge spar, wherein the opening is configured to surround a spreader bar by a spaced distance such that the secondary airfoil is not attached to the spreader bar.

8. The secondary airfoil apparatus of claim 1, further comprising an adjustable flap arranged on a trailing edge of the secondary airfoil apparatus.

9. A system for improving lift and aerodynamic performance of a floatplane, the system comprising:
    a pair of spaced floats, each having an upper surface;
    a pair of mounting members secured to the upper surfaces of the respective pair of spaced floats;
    a secondary airfoil; and
    a plurality of pairs of attachment arms, each pair of attachment arms extending in opposite directions from respective opposed exterior side surfaces of the secondary airfoil and toward the adjacent float of the spaced floats for fixedly connecting the secondary airfoil to the pair of mounting members and between the upper surfaces of the respective pair of spaced floats, the plurality of pairs of attachment arms being spaced along a length of the exterior side surfaces.

10. The system of claim 9, wherein the pair of mounting members each comprise a mounting member opening aligned with an attachment member opening arranged at the distal end within each of a pair of attachment arms.

11. The system of claim 10, further comprises a bolt or rivet extending through the mounting member opening and the attachment member opening.

12. The system of claim 9, wherein the secondary airfoil is configured vertically below a primary airfoil of the floatplane and horizontally between and not coupled to a pair of spreader bars that extend horizontally between the pair of spaced floats.

13. The system of claim 9, wherein the secondary airfoil is configured within a center of lift secondary airfoil axis that is substantially orthogonal to an upper and lower outer surfaces of the secondary airfoil, and wherein the center of lift secondary airfoil axis is co-linear with a center of lift of a primary airfoil axis of a primary airfoil wing of the floatplane.

14. The system of claim 9, wherein the secondary airfoil is configured partially around at least one spreader bar and not connected thereto.

15. The system of claim 9, further comprises:
    a collapsible fuel bladder arranged within the secondary airfoil; and
    a fuel delivery system configured to deliver fuel from the fuel bladder to the floatplane.

16. A method for improving lift and aerodynamic performance of a floatplane, the floatplane including a primary airfoil, a first float, and a second float, the method comprising:
    providing a secondary airfoil apparatus including:
        an airfoil including a front end, a trailing end, and opposed exterior side surfaces; and
        a plurality of pairs of attachment arms, each pair of attachment arms extending from the opposed exterior side surfaces and spaced along a length thereof; and
    securing each pair of attachment arms of the secondary airfoil apparatus to upper surfaces of the first float and the second float.

17. The method of claim 16, wherein the secondary airfoil comprises an opening extending between the opposed exterior side surface for receiving a spreader bar that spans the first and second floats.

18. The method of claim 16, wherein the securing comprises:
    connecting a first set of mounting members to the upper surface of the first float;
    connecting a second set of mounting members to the upper surface of the second float;

connecting a first set of attachment arms to a first sidewall surface of the secondary airfoil;

connecting a second set of attachment arms to a second sidewall surface of the secondary airfoil;

connecting the first set of mounting members to respective first set of attachment arms; and connecting the second set of mounting members to respective second set of attachment arms.

19. The method of claim 16, further comprising:

inserting a collapsible fuel bladder within the secondary airfoil; and delivering fuel from the fuel bladder to the floatplane.

\* \* \* \* \*